United States Patent
Choo et al.

(10) Patent No.: US 6,839,120 B2
(45) Date of Patent: Jan. 4, 2005

(54) REFLECTIVE OR TRANSFLECTIVE LIQUID CRYSTAL DISPLAY DEVICE AND METHOD FOR MANUFACTURING THE SAME

(75) Inventors: Kyo Seop Choo, Seoul (KR); Jae Young Chung, Busankwangyeok-shi (KR); June Ho Park, Kyongsangnam-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 205 days.

(21) Appl. No.: 10/029,146

(22) Filed: Dec. 28, 2001

(65) Prior Publication Data

US 2002/0122149 A1 Sep. 5, 2002

(30) Foreign Application Priority Data

Dec. 29, 2000 (KR) .................... 10-2000-86013

(51) Int. Cl.⁷ .................. G02F 1/1345; G09G 3/30; G09G 3/36
(52) U.S. Cl. ............. 349/152; 349/149; 349/113; 349/114; 345/80; 345/87
(58) Field of Search ............. 349/43, 113, 149–152, 349/159, 114, 162; 345/80, 90, 32

(56) References Cited

U.S. PATENT DOCUMENTS

,044,240 A * 4/1864 Choo et al. .............. 349/113
,057,406 A * 5/1866 Yasukawa ................ 349/113

(List continued on next page.)

FOREIGN PATENT DOCUMENTS

| EP | 0795324 A2 | 9/1997 |
|---|---|---|
| EP | 0598309 B1 | 1/1998 |
| WO | 00/23045 WO | 4/2000 |

OTHER PUBLICATIONS

Lee, B., "Controlled release of dual drug–loaded hydroxypropyl methylcellulose matrix tablet using drug–containing polymeric coatings" *International Journal of Pharmaceutics 188*, pp. 71–80, (1999).
Halsas et al., *S.T.P. Pharma Sciences* 8:3: 155–161 (1998).
Sirkia et al., *S.T.P. Pharma Sciences* 3:6: 453–458 (1993).
Sirkia et al., *International Journal of Pharmaceutics* 107: 179–187 (1994).
Sirkia et al., *European Journal of Pharmaceutical Sciences* 1: 195–201 (1994).

*Primary Examiner*—Toan Ton
*Assistant Examiner*—Mike Qi
(74) *Attorney, Agent, or Firm*—Birch, Stewart, Kolasch & Birch, LLP

(57) ABSTRACT

A line structure of a line on glass method in a reflective or a transflective liquid crystal display device and a method for manufacturing the same is disclosed, which offers decreased resistance by connecting a plurality of input lines in parallel. The LCD device includes a first line layer formed on a substrate, a first insulating layer formed on the substrate, having a contact hole at the first line layer, a second line layer formed on the first insulating layer, a second insulating layer formed on the substrate, having respective contact holes at the first and second line layers, a third line layer formed on the second insulating layer, a passivation layer formed on the substrate, having respective contact holes at the first, second and third line layers, and a pixel electrode on the passivation layer to electrically connect the first, second and third line layers through each contact hole.

18 Claims, 8 Drawing Sheets

U.S. PATENT DOCUMENTS

| | | | |
|---|---|---|---|
| ,093,609 A | * | 8/1869 | Baek et al. |
| ,105,604 A | * | 8/1870 | Ha et al. .................. 349/43 |
| ,109,811 A | * | 8/1870 | Park et al. ................. 349/113 |
| ,147,020 A | * | 8/1874 | Takahashi et al. ............ 349/43 |
| 4,292,299 A | | 9/1981 | Suzuki et al. |
| 4,786,503 A | | 11/1988 | Edgren et al. |
| 5,085,865 A | | 2/1992 | Nayak |
| 5,523,866 A | * | 6/1996 | Morimoto et al. ............ 349/43 |
| 5,549,913 A | | 8/1996 | Colombo et al. |
| 5,681,583 A | | 10/1997 | Conte et al. |
| 5,780,057 A | | 7/1998 | Conte et al. |
| 5,861,173 A | | 1/1999 | Nishioka et al. |
| 6,040,206 A | * | 3/2000 | Kurogane et al. .......... 438/149 |
| 6,292,237 B1 | * | 9/2001 | Hebiguchi .................... 349/39 |
| 6,323,051 B1 | * | 11/2001 | Shimada ...................... 438/30 |
| 6,372,255 B1 | | 4/2002 | Saslawski et al. |
| 6,466,280 B1 | * | 10/2002 | Park et al. ..................... 349/43 |
| 6,522,376 B1 | * | 2/2003 | Park et al. .................. 349/113 |
| 6,528,357 B2 | * | 3/2003 | Dojo et al. ................. 438/151 |
| 2002/0101398 A1 | * | 8/2002 | Fujita .......................... 345/90 |

\* cited by examiner

REFLECTIVE OR TRANSFLECTIVE LIQUID CRYSTAL DISPLAY DEVICE AND METHOD FOR MANUFACTURING THE SAME

This application claims the benefit of the Korean Application No. P2000-086013 filed on Dec. 29, 2000, which is hereby incorporated by reference.

BACKGROUND OF THE INVENTION

1. Field of the Invention

The present invention relates to a display device, and more particularly, to a line structure of an LOG (line on glass) method in a reflective or a transflective liquid crystal display device and a method for manufacturing the same.

2. Discussion of the Related Art

In general, an LCD module is classified into two categories according to a mounting method of a drive IC, the two categories being a chip on glass (COG) mounting method and a tape automated bonding (TAB) mounting method.

In the TAB mounting method, a tape carrier package (TCP) for the drive IC is connected to an LCD panel and a printed circuit board (PCB). In a case where the TCP is connected to the LCD panel, an anisotropic conduction film (ACF) is used instead of lead by considering particular material characteristics of a glass and a metal and by considering that a pitch corresponding to 0.2 mm or below is very sophisticated. On the other hand, in a case where the TCP is connected to the PCB, lead is used.

In the COG mounting method, the drive IC is directly mounted in gate and data regions of the LCD panel, so that an electrical signal is transmitted to the LCD panel. At this time, the anisotropic conduction film (ACF) is generally used to connect the drive IC to the LCD panel.

Meanwhile, in an LCD device according to the COG mounting method, an LOG mounting method forming a conductor on a lower glass substrate is used to apply signals to each drive IC.

A general LCD device according to the COG mounting method will be described with reference to the accompanying drawings.

FIG. 1 is a cross sectional view showing a structure of the general LCD device according to the COG mounting method.

As shown in FIG. 1, the general LCD device according to the COG mounting method includes an upper substrate 101, a lower substrate 102, a printed circuit board (PCB) substrate 103, a flexible printed circuit (FPC) 104 and a data transfer cable 105. Although the details of the upper substrate 101 are not shown, a polarizer is formed on one surface of the upper substrate 101, and a color filter and a common electrode are formed on the other surface of the upper substrate 101.

The lower substrate 102 is larger than the upper substrate 101. The polarizer is formed on one surface of the lower substrate 102, and the other surface of the lower substrate where the polarizer is not formed is opposite to the common electrode of the upper substrate 101. As shown in FIG. 1, a data line 109 of a data drive IC 107 is formed perpendicular to a gate line 108 of a gate drive IC 106. A plurality of input signals generated from a drive circuit of the PCB substrate 103 are applied to the data drive IC 107. A drive input line 110 of the data line 109 in which the input signals flow is connected to the FPC 104 and the data drive IC 107. Also, data output lines 111 of the data drive IC 107 are respectively connected to each data line 109.

A gate input signal of the drive circuit of the PCB substrate 103 is applied from the FPC 104 to the gate drive IC 106 through the drive input line 110 of the gate line. Then, the gate drive IC 106 generates a gate voltage for driving the LCD device, and outputs the gate voltage to an output terminal. At this time, the output terminal of the gate drive IC 106 is connected to each gate line 108 through gate output lines 112.

The data transfer cable 105 is formed to connect the PCB substrate 103 to the FPC 104, so that signals generated from the drive circuit of the PCB substrate 103 are applied to the data drive input line of the FPC substrate 104. That is, signals generated from the drive circuit of the PCB substrate 103 are applied to the data drive input line of the FPC 104 through the data transfer cable 105.

In the LCD device according to the present invention, a plurality of FPCs are required since a width of the FPC has to be widened to prevent a short from generating in input lines connected to an input terminal of the drive IC.

To use a small number of FPCs, it is useful to form the LCD device of the LOG method in which input lines of the data drive IC and the gate drive IC are directly formed on the lower substrate.

FIG. 2 illustrates a general LCD device according to an LOG method in which an input line is directly mounted on a substrate.

As shown in FIG. 2, the LCD device includes the PCB substrate 103, the FPC 104 having transfer lines, the lower substrate 102 and the upper substrate 101.

The lower substrate includes the input line 114 of the gate drive IC, the input line 113 of the data drive IC, a common voltage line (not shown), the gate drive IC 106, the data drive IC 107, the gate line 108 and the data line 109. In the upper substrate, a common electrode is formed. Although not shown, the common electrode is connected to the common voltage line of the lower substrate.

Referring to FIG. 2, in the general LCD device, the drive circuit of the PCB substrate 103 generates various input signals for driving the LCD device, and then the input signals are input to the transfer line of the FPC 104. Each transfer line of the FPC 104 is respectively connected to the input lines 114 of the gate drive IC 106 directly mounted to the lower substrate 102, and the input line of the data drive IC 107 directly mounted to the lower substrate 102.

The input signals applied to the input lines are input signals of the gate drive IC 106 and the data drive IC 107, and output signals of the drive ICs 106, 107 are respectively applied to each gate and data line 108, 109, thereby driving the LCD device according to signals of the gate and data lines 108, 109 applied the output signals.

FIG. 3 illustrates a cross sectional view showing a structure of an input line in the general LCD device according to the LOG method.

As shown in FIG. 3, an input line 202 is formed of the same material as the gate electrode on an insulating substrate 201, and then a gate insulating layer 203 is formed on an entire surface of the substrate 201 including the conductor 202 (input line). Then, an organic insulating material is deposited on the gate insulating layer 203 to form organic insulating layer 204, and a passivation layer 205 is formed on the organic insulating layer 204.

However, the related art LCD device and the method for manufacturing the same have the following problems.

In the circuit of the related art LCD device having a single-layered input line structure, a line resistance is higher than in the FPC, so that the drive signal is retarded, thereby generating a failure for exactly driving the LCD device.

SUMMARY OF THE INVENTION

Accordingly, the present invention is directed to an LCD device that substantially obviates one or more problems due to limitations and disadvantages of the related art.

An object of the present invention is to provide an LCD device in which a line resistance is decreased by changing a structure of an input line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a reflective or a transflective LCD device having an input line part includes a first line layer formed on a substrate, a first insulating layer formed on an entire substrate, having a contact hole at the first line layer, a second line layer formed on the first insulating layer, a second insulating layer formed on the entire substrate, having respective contact holes at the first and second line layers, a third line layer formed on the second insulating layer, a passivation layer formed on the entire substrate, having respective contact holes at the first, second and third line layers, and a pixel electrode on the passivation layer to electrically connect the first, second and third line layers through each contact hole.

Preferably, the first line layer is formed of the same material as a gate line.

Preferably, the first line layer is formed as a double-layered structure inclusive of an AlNd alloy and Mo.

Preferably, the second line layer is formed of the same material as a data line.

Preferably, the second line layer is formed of Cr.

Preferably, the third line layer is formed of the same material as a reflective layer.

Preferably, the third line layer is formed of AlNd alloy.

In another aspect, a method for manufacturing a reflective or transflective LCD device having a cell array region and an input line part includes the steps of forming a first insulating layer on an entire surface of a substrate, forming a semiconductor layer on the first insulating layer of the cell array region, forming a data line having source and drain electrodes at both sides of the semiconductor layer of the cell array region, simultaneously, a second line layer on the first insulating layer of the input line part, forming a second insulating layer on the entire surface of the substrate, forming a reflective layer on the second insulating layer of the cell array region, simultaneously, a third line layer on a third insulating layer of the input line part, forming a passivation layer on the entire surface of the substrate, forming respective contact holes to expose the drain electrode and surfaces of the first, second the third line layers, and forming a pixel electrode to connect the passivation layer of the cell array region to the first, second and third line layers.

In the present invention, the first, second and third input lines are connected in parallel, so that a resistance becomes lower than the related art single-layered input line structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A reflective or a transflective LCD device includes a lower substrate having a gate line, a data line and a reflective electrode, which are generally formed of a conductive metal. Accordingly, a three-layered input line structure is formed in the present invention.

Figure 1:
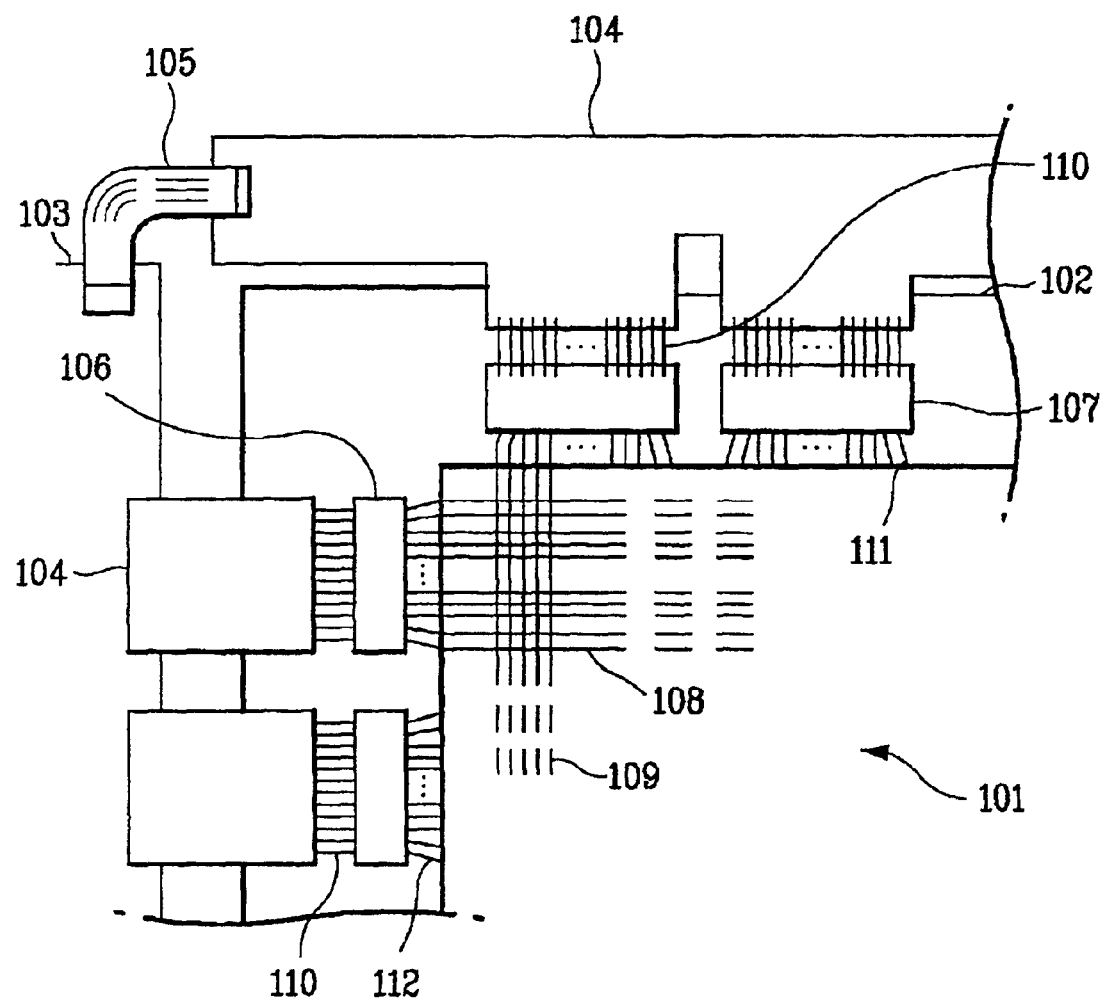
FIG. 1 illustrates a plan view of a general LCD device of a COG method.
Figure 2:
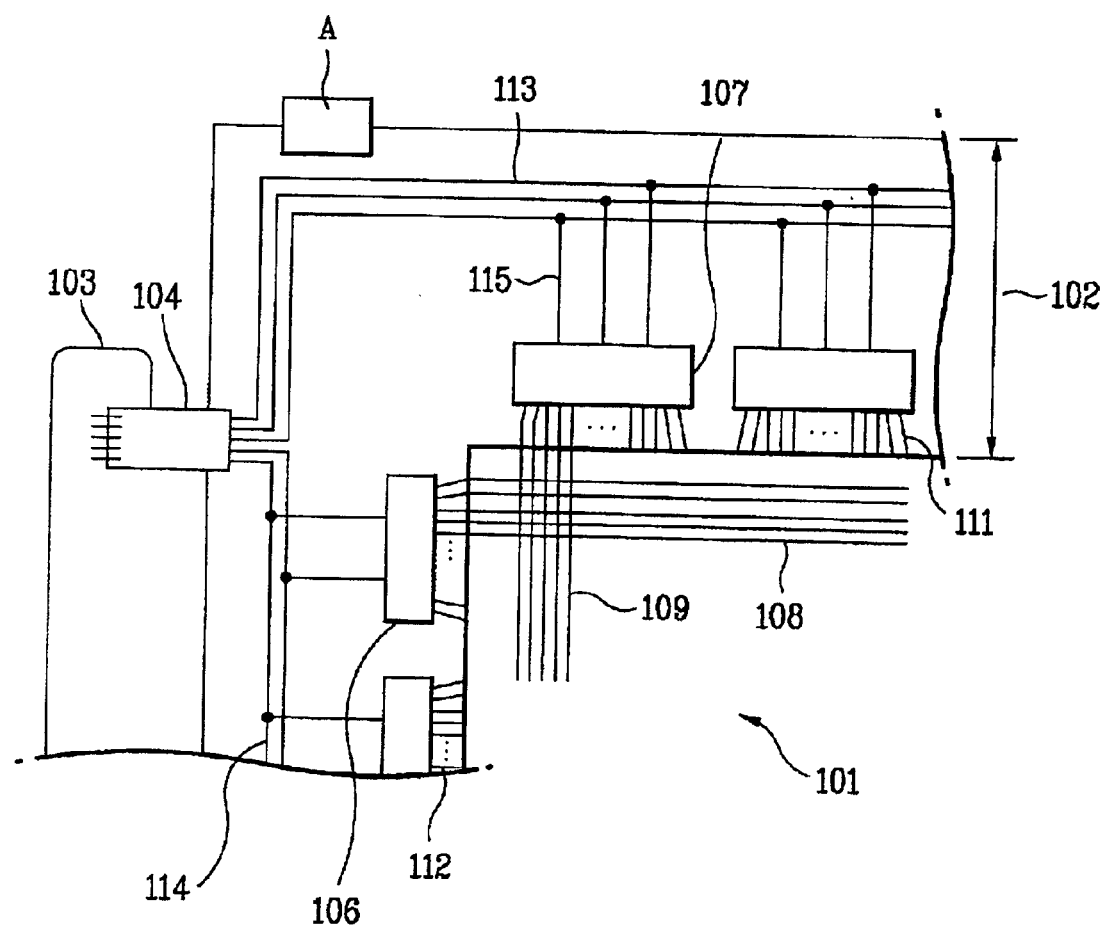
FIG. 2 illustrates a plan view of an LCD device in which a general input line is directly mounted on a substrate.
Figure 3:
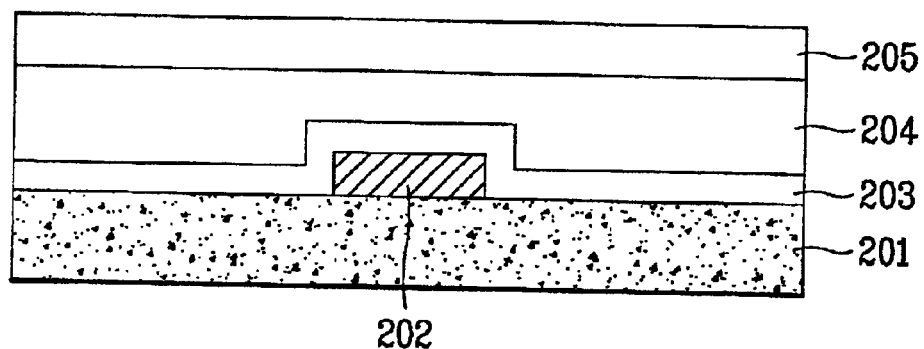
FIG. 3 illustrates a cross sectional view of an input line of a related art LCD device.
Figure 4:
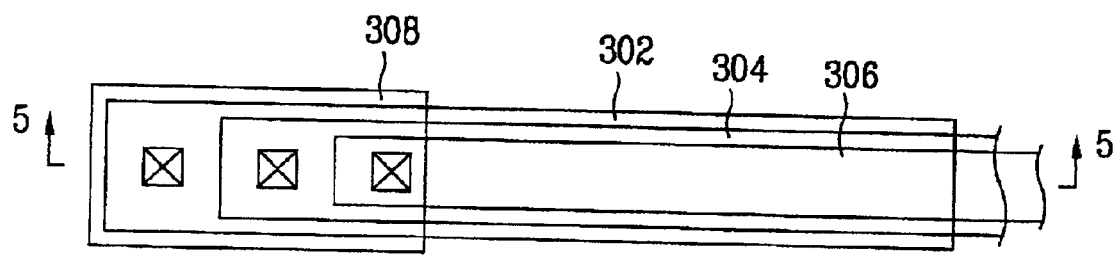
FIG. 4 illustrates a plan view showing a structure of an input line of a reflective LCD device or a transflective LCD device according to the present invention.
Figure 5:
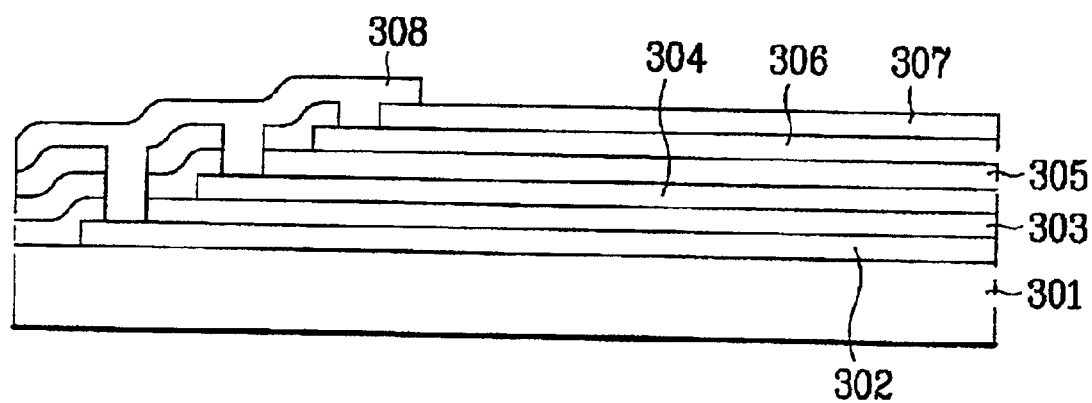
FIG. 5 illustrates a cross sectional view showing a structure of an input line of a reflective LCD device or a transflective LCD device according to the present invention taken along line 5—5 of FIG. 4.

FIG. 4 illustrates a plan view showing a structure of a LOG input line in a reflective or a transflective LCD device according to the present invention. FIG. 5 illustrates a cross sectional view showing a structure of an input line of a reflective LCD device or a transflective LCD device according to the present invention taken along line 5—5 of FIG. 4.

As shown in FIG. 4, the input line according to the present invention is formed of a three-layered structure inclusive of a first line layer 302, a second line layer 304 and a third line layer 306. At this time, the first line layer is formed of a metal (AlNd/Mo) for forming a gate line of a cell array region, and the second line layer is formed of the same metal (Cr) as a data line. The third line layer is formed of the same metal (AlNd/Mo) as a reflective layer. Then, the first, second and third line layers 302, 304 and 306 are connected by a fourth line layer 308 formed of a conductive material such as ITO that is the same material as a pixel electrode.

As shown in FIG. 5, the first line layer 302 is formed of the same metal (AlNd/Mo) as the gate line on an insulating substrate 301, and then a first insulating layer 303 is formed on the insulating substrate 301 including the first line layer 302. The second line layer 304 is formed of same metal as the data line on the first insulating layer 303. Then, a second insulating layer 305 of an organic insulating material such as Benzocyclobutene (BCB) is formed on the insulating substrate 301 including the second line layer 304, and the third line layer 306 is formed of the same metal (AlNd/Mo) as the reflective layer on the second insulating layer 305. Next, a passivation layer 307 is formed on the insulating substrate 301 including the third line layer 306. Subsequently, the first and second insulating layers 303 and 305 and the passivation layer 307 are selectively removed, so that respective contact holes are formed at the first, second and third line layers 302, 304 and 306. Then, a fourth line layer 308 of the same material as the pixel electrode is formed on the passivation layer 307 to electrically connect the first, second and third line layers 302, 304 and 306.

The first line layer 302 is a double-layered structure inclusive of an Aluminium Neodymium alloy (AlNd) and Mo. The second line layer 304 is formed of Cr, the third line layer 306 is formed of an AlNd alloy, and the fourth line layer 308 is formed of ITO.

A method of manufacturing the input line in the reflective or the transflective LCD device according to the present invention will be described in detail.

FIG. 6A to FIG. 6D illustrate cross sectional views showing manufacturing process steps of a TFT, a reflective layer and a pixel electrode of a reflective or a transflective LCD device according to the present invention. FIG. 7A to FIG. 7D illustrate cross sectional views showing manufacturing process steps of a LOG input line of a reflective or a transflective LCD device according to the present invention.

Figure 6A:
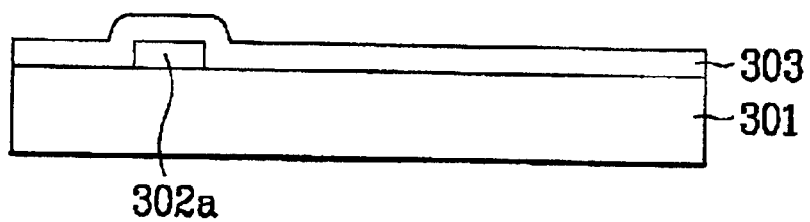
FIG. 6A to FIG. 6D illustrate cross sectional views showing manufacturing process steps of a cell array region of a reflective or a transflective LCD device according to the present invention.
Figure 7A:
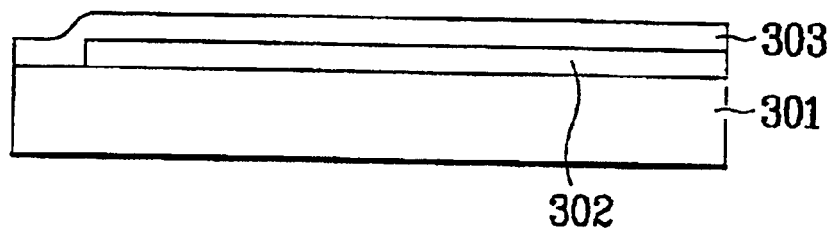
FIG. 7A to FIG. 7D illustrate cross sectional views showing manufacturing process steps of a LOG input line of a reflective or a transflective LCD device according to the present invention.

As shown in FIG. 6A and FIG. 7A, AlNd alloy and Mo are sequentially deposited on the insulating substrate 301 by sputtering or a similar process, and then are selectively patterned to form the gate line (not shown) having the gate electrode 302a in the cell array region and the first line layer 302 in the input line part.

An insulating material such as a silicon nitride $SiN_x$ is deposited on the insulating substrate including the first line layer 302 by chemical vapor deposition or a similar process, thereby forming the first insulating layer 303. If the TFT of the cell array region is a bottom gate type thin film transistor, the first insulating layer 303 is a gate insulating layer.

Figure 6B:
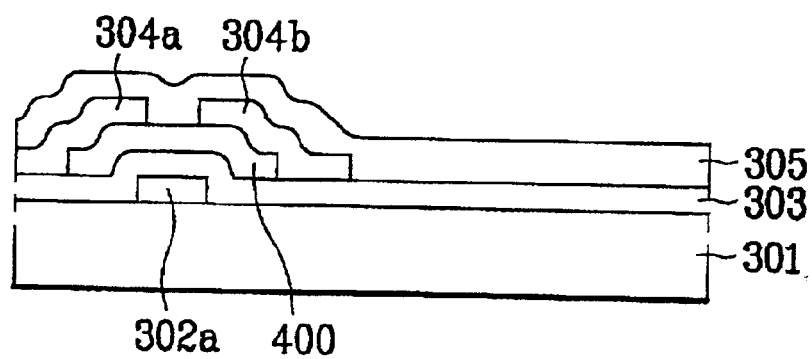
Figure 7B:
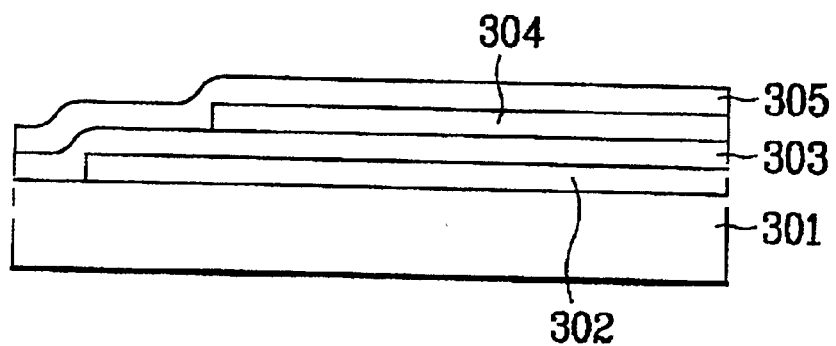

As shown in FIG. 6B and FIG. 7B, a semiconductor layer is deposited on the insulating substrate 301, and then is selectively removed to form an active layer 400 on the first insulating layer 303 above the gate electrode 302a. Then, a metal layer of Cr is deposited on the insulating substrate by sputtering or a similar process, and then is selectively removed to form the data line having source and drain electrodes 304a and 304b, simultaneously, to form the second line layer 304 on a portion of the first insulating layer 303 where the input line is formed.

The organic insulating material such as Benzocyclebutene (BCB) is deposited on the entire surface of the insulating substrate 301 including the data line having the source and drain electrodes 304a, 304b, and the second line layer 304, thereby forming the second insulating layer 305.

Figure 6C:
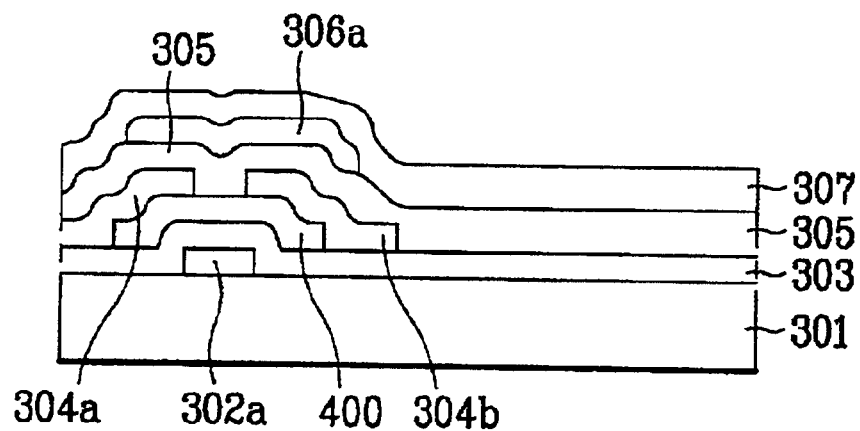
Figure 7C:
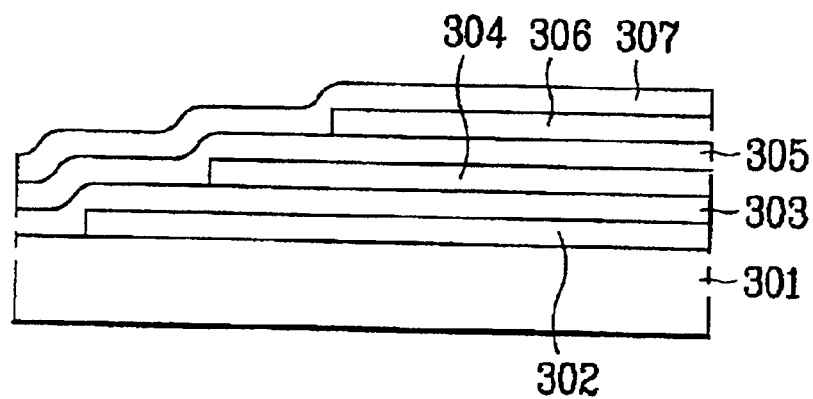

As shown in FIG. 6C and FIG. 7C, a metal layer such as AlNd is deposited on the insulating substrate 301, and then is selectively removed to form the reflective layer at the cell array region, and to form the third line layer 306 on the second insulating layer 305 of a portion where the input line is formed.

The passivation layer 307 is formed by depositing the insulating material such as silicon nitride $SiN_x$ on the entire surface of the insulating substrate including the third line layer 306.

Figure 6D:
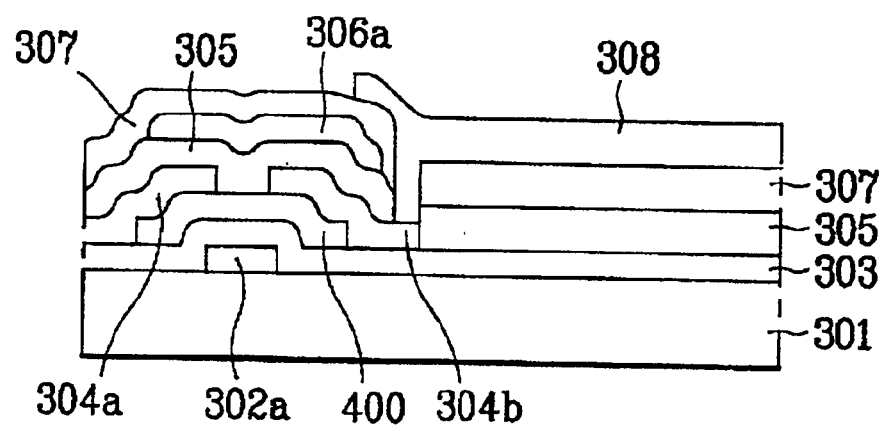
Figure 7D:
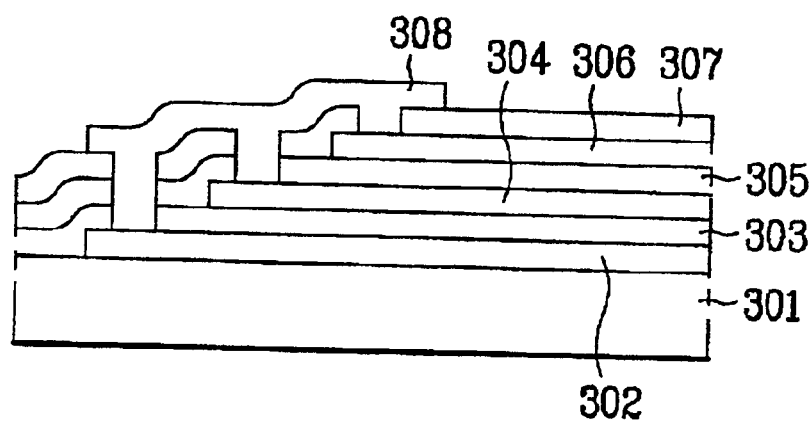

As shown in FIG. 6D and FIG. 7D, the contact holes are respectively formed to expose the drain electrode 304a of the cell array region, and predetermined portions of the first, second and third line layers 302, 304, 306 in the input line part. Then, a conductive material such as ITO is deposited on the passivation layer 307, and is selectively patterned to form the pixel electrode 308. At this time, the first, second and third line layers 302, 304, 306 are connected in parallel by the pixel electrode 308.

As mentioned above, the LCD device according to the present invention and the method for manufacturing have the following advantages.

The first, second and third line layers 302, 304, 306 are connected in parallel by the pixel electrode 308, thereby obtaining lower resistance than the related art single-layered input line structure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD device having an input line part comprising:
   a first line layer formed on a substrate;
   a first insulating layer formed on the substrate, having a contact hole therein located at the first line layer;
   a second line layer formed on the first insulating layer;
   a second insulating layer formed on the substrate, having respective contact holes therein located at the first and second line layers;
   a third line layer formed on the second insulating layer;
   a passivation layer formed on the substrate, having respective contact holes therein located at the first, second and third line layers; and
   a pixel electrode on the passivation layer to electrically connect the first, second and third line layers through each contact hole.

2. The LCD device as claimed in claim 1, wherein the first line layer is formed of the same material as a gate line.

3. The LCD device as claimed in claim 1, wherein the first line layer is formed as a double-layered structure inclusive of an AlNd alloy and Mo.

4. The LCD device as claimed in claim 1, wherein the second line layer is formed of the same material as a data line.

5. The LCD device as claimed in claim 1, wherein the second line layer is formed of Cr.

6. The LCD device as claimed in claim 1, wherein the third line layer is formed of the same material as a reflective layer.

7. The LCD device as claimed in claim 1, wherein the third line layer is formed of an AlNd alloy.

8. The LCD device as claimed in claim 1, wherein the LCD device is a reflective LCD device.

9. The LCD device as claimed in claim 1, wherein the LCD device is a transflective LCD device.

10. The LCD device as claimed in claim 1, wherein the first insulating layer is formed on an entire surface of the substrate.

11. The LCD device as claimed in claim 1, wherein the second insulating layer is formed on an entire surface of the substrate.

12. The LCD device as claimed in claim 1, wherein the passivation layer is formed on an entire surface of the substrate.

13. A method for manufacturing LCD device having a cell array region and an input line part comprising the steps of:
- simultaneously forming a gate line on a substrate of the cell array region, and a first line layer on the substrate at the input line part;
- forming a first insulating layer on the substrate;
- forming a semiconductor layer on the first insulating layer of the cell array region;
- simultaneously forming a data line having source and drain electrodes at both sides of the semiconductor layer of the cell array region and a second line layer on the first insulating layer of the input line part;
- forming a second insulating layer on the substrate;
- simultaneously forming a reflective layer on the second insulating layer of the cell array region and a third line layer on the second insulating layer of the input line part;
- forming a passivation layer on the substrate;
- forming respective contact holes to expose the drain electrode of the cell array region, and surfaces of the first, second and third line layers of the input line part; and
- forming a pixel electrode on the passivation layer to electrically connect to the drain electrode of the cell array region and to connect the first, second and third line layers through the contact holes in the input line part, said first, second and third line layers providing signals to driver ICs, said driver ICs applying output signals to said gate line or said data line.

14. The method as claimed in claim 13, wherein the LCD device is a reflective LCD device.

15. The method of as claimed in claim 13, wherein the LCD device is a transflective LCD device.

16. The method as claimed in claim 13, wherein the first insulating layer is formed on an entire surface of the substrate.

17. The method as claimed in claim 13, wherein the second insulating layer is formed on an entire surface of the substrate.

18. The method as claimed in claim 13, wherein the passivation layer is formed on an entire surface of the substrate.

* * * * *